(12) United States Patent
Guo et al.

(10) Patent No.: US 12,512,884 B2
(45) Date of Patent: Dec. 30, 2025

(54) DATA PROCESSING METHOD AND COMMUNICATION APPARATUS

(71) Applicant: Huawei Technologies Co., Ltd., Shenzhen (CN)

(72) Inventors: Senbao Guo, Xi'an (CN); Peigang Jiang, Shanghai (CN); Ye Yang, Kista (SE); Guibao Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 18/756,799

(22) Filed: Jun. 27, 2024

(65) Prior Publication Data
US 2024/0348300 A1 Oct. 17, 2024

Related U.S. Application Data

(63) Continuation of application No. PCT/CN2022/136799, filed on Dec. 6, 2022.

(30) Foreign Application Priority Data

Dec. 29, 2021 (CN) .......................... 202111637391.4

(51) Int. Cl.
*H04B 7/02* (2018.01)
*H04B 7/0417* (2017.01)
*H04B 7/0456* (2017.01)

(52) U.S. Cl.
CPC ......... *H04B 7/0456* (2013.01); *H04B 7/0417* (2013.01)

(58) Field of Classification Search
CPC .......................... H04B 7/0456; H04B 7/0417
USPC ................ 375/267, 260, 259, 219, 295, 316
See application file for complete search history.

(56) References Cited

U.S. PATENT DOCUMENTS

2019/0215039 A1* 7/2019 Gao ..................... H04B 7/0421

FOREIGN PATENT DOCUMENTS

CN 107422317 B 9/2020

OTHER PUBLICATIONS

Song Yang et al: "A realistic algorithm design of 128-antenna prototype for massive MIMO", 2016 IEEE/CIC International Conference on Communications in China (ICCC Workshops), IEEE, Jul. 27, 2016 (Jul. 27, 2016), pp. 1-6, XP032976336.

(Continued)

*Primary Examiner* — Zewdu A Kassa
(74) *Attorney, Agent, or Firm* — Slater Matsil, LLP

(57) ABSTRACT

This application provides a data processing method and a communication apparatus, and relates to the field of communication technologies. The method can be used for downlink data processing and uplink data processing. The communication apparatus may receive a reference signal, and obtain a first matrix based on the reference signal. The first matrix is an autocorrelation matrix whose dimension is N rows and N columns, and N indicates a quantity of channels of an antenna array. Based on the first matrix, channels in different rows of the antenna array are averaged to obtain a second matrix, where a dimension of the second matrix is $N/(x \times R)$ rows and $N/(x \times R)$ columns; R represents a quantity of channel rows of the antenna array; x represents polarization of the antenna array.

20 Claims, 4 Drawing Sheets

200

S201. Obtain a reference signal fed back by a communication apparatus

S202. Obtain a first matrix based on the reference signal, where the first matrix is an autocorrelation matrix whose dimension is N rows and N columns, and N indicates a quantity of channels of an antenna array S203. Average, based on the first matrix, channels in different rows of the antenna array to obtain a second matrix, where a dimension of the second matrix is $N/(x \times R)$ rows and $N/(x \times R)$ columns; N, R, and x are all positive integers; R represents a quantity of channel rows of the antenna array; x represents polarization of the antenna array; and when the antenna array is a single-polarized antenna array, x is 1; or when the antenna array is a dual-polarized antenna array, x is 2

(56) References Cited

OTHER PUBLICATIONS

Ren Yuwei et al: "Low-complexity channel reconstruction methods based on SVD-ZF precoding in massive 3D-MIMO systems", China Communications, China Institute of Communications, Piscataway, NJ, USA, vol. 12, No. Supplement, Dec. 1, 2015 (Dec. 1, 2015), pp. 49-57, XP011595977.

* cited by examiner

100A

200

200

S201. Obtain a reference signal fed back by a communication apparatus

S202. Obtain a first matrix based on the reference signal, where the first matrix is an autocorrelation matrix whose dimension is N rows and N columns, and N indicates a quantity of channels of an antenna array S203. Average, based on the first matrix, channels in different rows of the antenna array to obtain a second matrix, where a dimension of the second matrix is N/(x×R) rows and N/(x×R) columns; N, R, and x are all positive integers; R represents a quantity of channel rows of the antenna array; x represents polarization of the antenna array; and when the antenna array is a single-polarized antenna array, x is 1; or when the antenna array is a dual-polarized antenna array, x is 2

FIG. 2

DATA PROCESSING METHOD AND COMMUNICATION APPARATUS

CROSS-REFERENCE TO RELATED APPLICATIONS

This application is a continuation of International Application No. PCT/CN2022/136799, filed on Dec. 6, 2022, which claims priority to Chinese Patent Application No. 202111637391.4, filed on Dec. 29, 2021. The disclosures of the aforementioned applications are herein incorporated by reference in their entireties.

TECHNICAL FIELD

Embodiments of this application relate to the field of communication technologies, and in particular, to a data processing method and a communication apparatus.

BACKGROUND

In a conventional cell split solution, different beam weight values are superimposed on a same physical antenna to split an original cell into a plurality of horizontal or vertical physical cells. A terminal may obtain channel information by measuring a weighted pilot signal, and select, according to a measurement algorithm, codebook information that best matches the channel information for feedback. A base station may perform precoding weighting on downlink data by using a weight value and the codebook information fed back by the terminal.

In the foregoing process, the channel information fed back by the terminal is quantized, and there is a large error between the channel information and real downlink channel information. As a result, weight value performance is low, and data processing efficiency is also low. Therefore, how to design a data processing method to improve the weight value performance and data processing efficiency becomes an urgent problem to be resolved.

SUMMARY

This application provides a data processing method and a communication apparatus, to improve weight value performance, so as to improve data processing efficiency.

According to a first aspect, this application provides a data processing method. The method may be applied to a first communication apparatus, or may be applied to a second communication apparatus. The first communication apparatus may be understood as a network device, for example, a transmission reception point (TRP) or a 5G base station (gNB), or may be understood as a module (for example, a chip) in a network device. The second communication apparatus may be understood as a terminal device, for example, user equipment (UE) or a vehicle-mounted device, or may be understood as a module (for example, a chip) in a terminal device. This is not specifically limited in this application.

The following uses an example in which the first communication apparatus is a network device and the second communication apparatus is a terminal device for description. During downlink data transmission, the network device obtains a reference signal fed back by the terminal device, and then performs channel estimation based on the reference signal, to obtain a first matrix. The first matrix is an autocorrelation matrix whose dimension is N rows and N columns, and N indicates a quantity of channels of an antenna array. Based on the first matrix, the network device averages channels in different rows of the antenna array to obtain a second matrix, where a dimension of the second matrix is $N/(x \times R)$ rows and $N/(x \times R)$ columns; N, R, and x are positive integers; R represents a quantity of channel rows of the antenna array; x represents polarization of the antenna array; and when the antenna array is a single-polarized antenna array, x is 1; or when the antenna array is a dual-polarized antenna array, x is 2.

During uplink data transmission, the terminal device may also perform the foregoing data processing operation. Details are not described herein again.

The reference signal may be a sounding reference signal (SRS), a channel state information reference signal (CSI-RS), and a demodulation reference signal (DMRS), or may be another reference signal. The network device or the terminal device measures the reference signal, estimates a channel status, and obtains a first matrix related to the channel status. If the operation is performed by the network device, the first matrix is an uplink autocorrelation matrix. If the operation is performed by the terminal device, the first matrix is a downlink autocorrelation matrix.

Usually, the dimension of the first matrix is related to the quantity of channels of the antenna array. For example, if the quantity of channels of the antenna array of the network device is 32, a dimension of the first matrix is 32×32, that is, 32 rows and 32 columns. In this manner, the dimension of the first matrix is large, and calculation complexity is high. In this application, when a dimension of the second matrix is obtained, not only the quantity of channels of the antenna array is considered, but also a quantity of channel rows of the antenna array and a polarization status of the antenna array may be considered. For example, if a quantity of channels of an antenna array of the network device is 32, a quantity of channel rows of the antenna array of the network device is 2, and the antenna array is a dual-polarized antenna array, a dimension of a second matrix is $32/(2 \times 2)$ rows and $32/(2 \times 2)$ columns, that is, 8 rows and 8 columns. The dimension of the second matrix obtained in this application is low. Therefore, during data calculation, a data amount is small, and data processing efficiency is high. In addition, because the channels between different rows of the antenna array are averaged based on the first matrix, impact of related interference between channel rows of the antenna array is reduced, and precision of the second matrix is improved. Consequently, weight value performance is improved.

In an optional manner, the averaging, based on the first matrix, channels in different rows of the antenna array to obtain the second matrix includes: obtaining, along a main diagonal of the first matrix, $x \times R$ matrices whose dimensions are $N/(x \times R)$ rows and $N/(x \times R)$ columns, and averaging the $x \times R$ matrices whose dimensions are $N/(x \times R)$ rows and $N/(x \times R)$ columns, to obtain the second matrix.

It should be noted that the $x \times R$ matrices whose dimensions are $N/(x \times R)$ rows and $N/(x \times R)$ columns obtained according to the foregoing method are matrices that are co-polarized and that are in a same row. The second matrix is obtained by averaging the matrices that are co-polarized and that are in a same row. In this case, impact of related interference between rows is reduced, and precision of the second matrix is improved. Consequently, the weight value performance is improved.

In an optional manner, a third matrix is obtained based on the second matrix and a transformation matrix, where the transformation matrix is related to an uplink frequency and a downlink frequency, and the third matrix is a product of the transformation matrix and the second matrix. A weight value is obtained based on the third matrix, and data is weighted based on the weight value.

When the first matrix is an uplink autocorrelation matrix, the third matrix is a downlink autocorrelation matrix. When the first matrix is a downlink matrix, the third matrix is an uplink autocorrelation matrix. The transformation matrix may obtain an autocorrelation matrix of a downlink channel by using an autocorrelation matrix of an uplink channel based on a feature like power angular spectrum reciprocity of an uplink channel and a downlink channel, or obtain an autocorrelation matrix of an uplink channel based on an autocorrelation matrix of a downlink channel.

In an optional manner, the transformation matrix may be obtained based on an actual pattern of the antenna channels and a preset mathematical theorem, where the preset mathematical theorem is a projection theorem or a series theorem.

The transformation matrix is obtained based on the actual pattern of the antenna channels and the preset mathematical theorem, so that precision of the transformation matrix can be ensured. When precision of the transformation matrix is high, the third matrix obtained based on the transformation matrix is precise. Calculation is performed based on the precise third matrix, so that a more precise weight value can be obtained. Consequently, the weight value performance is improved.

In an optional manner, singular value decomposition (SVD) is performed on the first matrix, and an eigenvalue less than a first preset threshold is set to zero, to obtain a corrected first matrix. The second matrix is obtained based on the corrected first matrix. By performing SVD and setting a small eigenvalue to zero (in other words, removing an eigenvalue less than the first preset threshold), an error caused by insufficient statistics of the first matrix can be reduced. In this way, precision of the first matrix is improved. Consequently, the weight value performance is improved.

In an optional manner, SVD is performed on the transformation matrix, and an eigenvalue less than a second preset threshold is set to zero, to obtain a corrected transformation matrix. The third matrix is obtained based on the second matrix and the transformation matrix. By performing SVD and setting a small eigenvalue to zero (in other words, removing an eigenvalue less than the second preset threshold) on the transformation matrix, an impact of cross-correlation between sub-paths in the transformation matrix can be reduced. In this way, precision of the transformation matrix is improved. Consequently, the weight value performance is improved.

In an optional manner, when a sub-path power included in the second matrix is a negative number, the sub-path power is set to zero. By setting the negative sub-path power to zero, an impact on the performance caused by a negative power path can be effectively reduced, and precision of the third matrix can be improved. Consequently, the weight value performance is improved.

In an optional manner, a signal increment and an interference increment may be obtained based on the third matrix and the weight value. According to an obtained channel increment and interference increment, whether to perform a correction operation may be adaptively selected, so as to obtain a better weight value.

In an optional manner, the reference signal includes one of the following: an SRS, a CSI-RS, or a DMRS.

According to a second aspect, this application provides a communication apparatus. The communication apparatus may be understood as a network device, for example, a TRP or gNB, or may be understood as a module (for example, a chip) in a network device, or may be understood as a terminal device, for example, user UE or a vehicle-mounted device, or may be understood as a module (for example, a chip) in a terminal device. This is not specifically limited in this application. The communication apparatus may include a processing unit and a transceiver unit.

It should be understood that the foregoing transceiver unit may be referred to as an input/output unit, a communication unit, or the like. When the communication apparatus is a terminal device, the input/output unit may be a transceiver, and the processing unit may be a processor. When the communication apparatus is a module (for example, a chip) in a terminal device, the input/output unit may be an input/output interface, an input/output circuit, an input/output pin, or the like, and may also be referred to as an interface, a communication interface, an interface circuit, or the like. The processing unit may be a processor, a processing circuit, a logic circuit, or the like.

The transceiver unit is configured to receive a reference signal that is fed back. The processing unit is configured to: obtain a first matrix based on the reference signal, where the first matrix is an autocorrelation matrix whose dimension is N rows and N columns, and N indicates a quantity of channels of an antenna array; and average, based on the first matrix, channels in different rows of the antenna array to obtain a second matrix, where a dimension of the second matrix is $N/(x \times R)$ rows and $N/(x \times R)$ columns; N, R, and x are all positive integers; R represents a quantity of channel rows of the antenna array; x represents polarization of the antenna array; and when the antenna array is a single-polarized antenna array, x is 1; or when the antenna array is a dual-polarized antenna array, x is 2.

The reference signal may be an SRS, a CSI-RS, and a DMRS, or may be another reference signal. A network device or a terminal device measures the reference signal, estimates a channel status, and obtains a first matrix related to the channel status. If the operation is performed by the network device, the first matrix is an uplink autocorrelation matrix. If the operation is performed by the terminal device, the first matrix is a downlink autocorrelation matrix. In addition, when the first matrix is an uplink autocorrelation matrix, a third matrix is a downlink autocorrelation matrix. When the first matrix is a downlink autocorrelation matrix, a third matrix is an uplink autocorrelation matrix.

The reference signal may be a sounding reference signal (SRS), a channel state information reference signal (CSI-RS), and a demodulation reference signal (DMRS), or may be another reference signal. The network device or the terminal device measures the reference signal, estimates a channel status, and obtains a first matrix related to the channel status. If the operation is performed by the network device, the first matrix is an uplink autocorrelation matrix. If the operation is performed by the terminal device, the first matrix is a downlink autocorrelation matrix.

Usually, the dimension of the first matrix is related to the quantity of channels of the antenna array. For example, if a quantity of channels of an antenna array of the network device is 32, a dimension of a first matrix is 32×32. In this manner, the dimension of the first matrix is large, and calculation complexity is high. In this application, when a dimension of the second matrix is obtained, not only the quantity of channels of the antenna array is considered, but also a quantity of channel rows of the antenna array and a polarization status of the antenna array may be considered. For example, if the quantity of channels of the antenna array of the network device is 32, the quantity of channel rows of the antenna array of the network device is 2, and the antenna array is a dual-polarized antenna array, the dimension of the second matrix is 32/(2×2) rows and 32/(2×2) columns, that is, 8 rows and 8 columns. The dimension of the second matrix obtained in this application is low. Therefore, during data calculation, a data amount is small, and data processing efficiency is high. In addition, because the channels between different rows of the antenna array are averaged based on the first matrix, impact of related interference between channel rows of the antenna array is reduced, and precision of the second matrix is improved. Consequently, weight value performance is improved.

In an optional manner, the processing unit is configured to: obtain, along a main diagonal of the first matrix, x×R matrices whose dimensions are N/(x×R) rows and N/(x×R) columns, and average the x×R matrices whose dimensions are N/(x×R) rows and N/(x×R) columns, to obtain the second matrix.

In an optional manner, the processing unit is further configured to: obtain a third matrix based on the second matrix and a transformation matrix, where the transformation matrix is related to an uplink frequency and a downlink frequency, and the third matrix is a product of the transformation matrix and the second matrix; and obtain a weight value based on the third matrix, and weight data based on the weight value.

In an optional manner, the transformation matrix may be obtained based on an actual pattern of the antenna channels and a preset mathematical theorem, where the preset mathematical theorem is a projection theorem or a series theorem.

In an optional manner, the processing unit is further configured to: perform SVD based on the first matrix, and remove an eigenvalue less than a first preset threshold, to obtain a corrected first matrix; and obtain a second matrix based on the corrected first matrix.

In an optional manner, the processing unit is further configured to: perform SVD based on the transformation matrix, and remove an eigenvalue less than a second preset threshold, to obtain a corrected transformation matrix; and obtain the third matrix based on the second matrix and the transformation matrix.

In an optional manner, when a sub-path power included in the second matrix is a negative number, the sub-path power is set to zero.

In an optional manner, the processing unit is further configured to: obtain a signal increment and an interference increment based on the third matrix and the weight value.

In an optional manner, the processing unit is further configured to obtain the first matrix based on the reference signal, where the reference signal includes one of the following: an SRS, a CSI-RS, or a DMRS.

According to a third aspect, this application provides a communication apparatus, including a processor. The processor is coupled to a memory. The memory is configured to store a program or instructions. When the program is executed or the instructions are executed by the processor, the communication apparatus is enabled to perform the method in any one of the first aspect and the embodiments of the first aspect.

According to a fourth aspect, this application provides another communication apparatus, including an interface circuit and a logic circuit. The interface circuit may be understood as an input/output interface. The logic circuit may be configured to run code instructions to perform the method in any one of the first aspect and the embodiments of the first aspect.

According to a fifth aspect, this application further provides a computer-readable storage medium. The computer-readable storage medium stores computer-readable instructions. When the computer-readable instructions are run on a computer, the computer is enabled to perform the method in any one of the first aspect and the possible designs of the first aspect.

According to a sixth aspect, this application provides a computer program product including instructions. When the computer program is run or the instructions are run on a computer, the computer is enabled to perform the method in any one of the first aspect and the embodiments of the first aspect.

According to a seventh aspect, this application provides a chip system. The chip system includes a processor, and may further include a memory. The chip system is configured to implement the method in any one of the first aspect and the possible designs of the first aspect. The chip system may include a chip, or may include a chip and another discrete component.

According to an eighth aspect, this application provides a communication system. The system includes a first communication apparatus and/or a second communication apparatus. The communication system is configured to perform the method in any one of the first aspect and the possible designs of the first aspect.

For technical effects that can be achieved in the second aspect to the eighth aspect, refer to descriptions of technical effects that can be achieved in the corresponding possible design solutions in the first aspect. Details are not described herein again in this application.

BRIEF DESCRIPTION OF THE DRAWINGS

FIG. 2 is a block diagram of a data processing method according to an embodiment of this application;

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, a plurality of means two or more than two. Therefore, for implementations of the apparatus and the method, reference may be made to each other, and repeated parts are not described again.

This application may be applied to a new radio (NR) system in a 5th generation mobile communication technology (5G), or may be applied to another communication system like a next generation communication system. The following describes a communication system applicable to this application. In the communication system, a first communication apparatus may be a terminal device, and a second communication apparatus may be a network device. This is not specifically limited in actual application of this application.

Figure 1A:
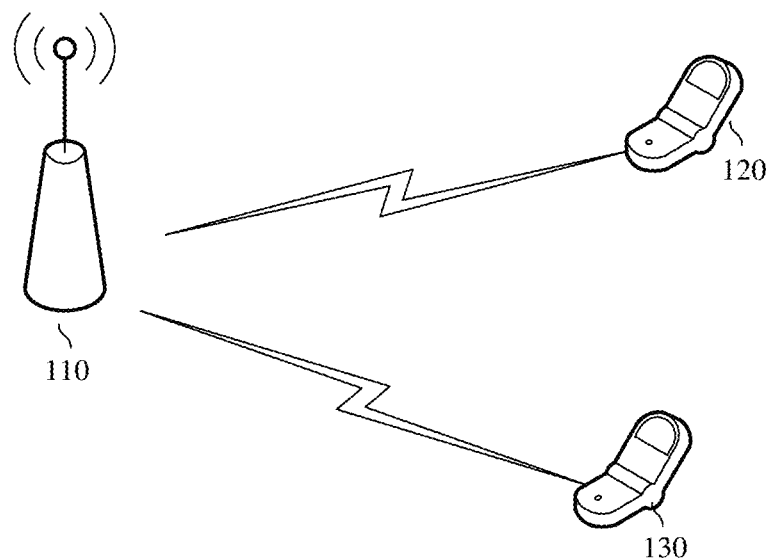
FIG. 1A is a diagram of a communication system according to an embodiment of this application.

FIG. 1A shows a communication system 100 applicable to this application. The communication system 100 includes a network device 110, a terminal device 120, and a terminal device 130. Data sent by the network device 110 to the terminal device 110 or the terminal device 120 may be understood as downlink data transmission. The network device sends the downlink data and a downlink reference signal. The terminal device receives the downlink data sent by the network device, and feeds back, to the network device, whether the downlink data is successfully received.

Figure 1B:
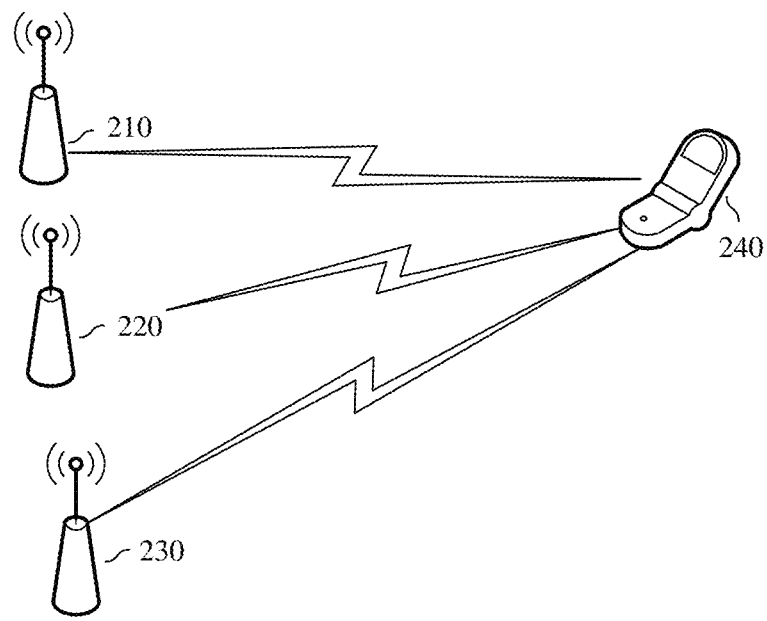
FIG. 1B is another diagram of a communication system according to an embodiment of this application.

FIG. 1B shows another communication system 200 applicable to this application. The communication system 200 includes a network device 210, a network device 220, a network device 230, and a terminal device 240. Sending, by the terminal device 240, data to the network device 210 may be understood as uplink data transmission. The terminal device performs downlink channel quality measurement based on the downlink reference signal sent by the network device, and feeds back related measurement information to the network device. The terminal device sends the uplink data and an uplink reference signal to the network device. The network device receives the uplink data sent by the terminal device, and feeds back, to the terminal device, whether the uplink data is successfully received. The network device may perform channel estimation and channel measurement based on the uplink reference signal sent by the terminal device.

A data processing method provided in this application may be applicable to the communication system for downlink communication shown in FIG. 1A, and may also be applicable to the communication system for uplink communication shown in FIG. 1B. This is not specifically limited in this application.

The network device is an apparatus that is deployed in a radio access network to provide a wireless communication function for a terminal device. A network device is a device having a wireless transceiver function or a chip that may be disposed on the device. The device includes but is not limited to an evolved NodeB (eNB), a baseband unit (BBU), an access point (AP) in a wireless fidelity (Wi-Fi) system, a wireless relay node, a wireless backhaul node, a transmission point (TRP, or transmission point, TP), or the like, or may be a gNB or a transmission point (TRP or TP) in a 5G (for example, NR) system, one or a group of antenna panels (including a plurality of antenna panels) of a base station in a 5G system, or may be a network node that forms a gNB or a transmission point, for example, a baseband unit (BBU), a distributed unit (DU), a satellite, or an unmanned aerial vehicle.

In some deployments, a gNB may include a central unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. For example, information of the RRC layer is finally changed to information of the PHY layer (that is, sent by using the PHY layer), or is converted from the information of the PHY layer. Therefore, in this architecture, higher layer signaling, for example, RRC-layer signaling or PDCP-layer signaling, may also be considered to be sent by the DU, or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device in embodiments of this application may also be referred to as a terminal, and is an entity on a user side configured to receive or transmit a signal, and is configured to send an uplink signal to a network device, or receive a downlink signal from the network device. The terminal device includes a device that provides a user with voice and/or data connectivity, for example, may include a handheld device with a wireless connection function, or a processing device connected to a wireless modem. The terminal device may communicate with a core network through a radio access network (RAN), and exchange a voice and/or data with the RAN. The terminal device may include UE, a vehicle-to-everything (V2X) terminal device, a wireless terminal device, a mobile terminal device, a device-to-device (D2D) terminal device, a machine-to-machine/machine-type communication (M2M/MTC) terminal device, an internet of things (IoT) terminal device, a subscriber unit (subscriber unit), a subscriber station (subscriber station), a mobile station (mobile station), a remote station (remote station), an access point (AP), a remote terminal (remote terminal), an access terminal (access terminal), a user terminal (user terminal), a user agent (user agent), user equipment (user equipment), a wearable device, a vehicle-mounted device, an unmanned aerial vehicle, or the like.

As an example rather than a limitation, in embodiments of this application, the terminal device may alternatively be a wearable device. The wearable device may also be referred to as a wearable intelligent device, an intelligent wearable device, or the like, and is a generic term for wearable devices such as glasses, gloves, watches, clothes, and shoes that are developed based on intelligent design of daily wearing by using wearable technologies. The wearable device is a portable device that can be directly worn on a body or integrated into a piece of clothing or an accessory of a user. The wearable device is not only a hardware device, but also implements a powerful function through software support, data exchange, and cloud interaction. In a broad sense, the wearable intelligent device includes a full-featured and large-sized device that can implement complete or partial functions without depending on a smartphone, for example, a smart watch or smart glasses, and includes a device that focuses only on a specific type of application function and needs to be used together with another device like a smartphone, for example, various smart bands, smart helmets, smart jewelry used for vital sign monitoring.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

In a frequency division duplex (FDD) system, because an uplink channel and a downlink channel are in different carrier bands, reciprocity does not exist between the uplink and downlink channels. The network device needs the terminal to feed back downlink channel information, to perform weight value calculation. Because there is a quantization error in the downlink channel information fed back by the terminal, there is a large error between the downlink channel information fed back by the terminal and a real downlink channel. A large error occurs in weight value calculation by the network device, and weight value performance is affected.

To resolve the foregoing problem, this application provides a data processing method, to improve precision of obtained channel information and the weight value performance, so as to improve data processing efficiency. The method may be applied to a network device, for example, a TRP or a gNB. The network device may also be understood as a module (for example, a chip) in the network device, or may be applied to a terminal device, for example, UE or a vehicle-mounted device. The terminal device may also be understood as a module (for example, a chip) in the terminal device. This is not specifically limited in this application.

The data processing method provided in this application is applicable to a multi-antenna scenario, especially to a scenario in which there are eight or more antennas. The plurality of antennas may form an antenna array in a specific order. The antenna array includes a horizontal antenna column and a vertical antenna column. A channel in the horizontal antenna column is a row channel. A larger quantity of row channels indicates a larger corresponding beam gain and better performance. In addition, the antennas may be single-polarized or dual-polarized. This is not specifically limited herein. Refer to FIG. 2. FIG. 2 is a block diagram of a data processing method 200 according to an embodiment of this application. In actual application, the data processing method 200 may be applied to downlink data processing, or may be applied to uplink data processing. The data processing method 200 includes but is not limited to the following steps.

S201. Obtain a reference signal fed back by a communication apparatus.

The reference signal may be a sounding reference signal (SRS), a demodulation reference signal (DMRS), a channel state information reference signal (CSI-RS), or another reference signal.

S202. Obtain a first matrix based on the reference signal, where the first matrix is an autocorrelation matrix whose dimension is N rows and N columns, and N indicates a quantity of channels of an antenna array.

A network device or a terminal device measures the reference signal to estimate a channel status, for example, a channel coefficient H, and then performs an autocorrelation operation on the channel coefficient H to obtain the first matrix related to the channel status. If the operation is performed by the network device, the first matrix is an uplink channel autocorrelation matrix. If the operation is performed by the terminal device, the first matrix is a downlink channel autocorrelation matrix.

The dimension of the first matrix may be related to the quantity of channels in the antenna array. For example, a quantity of channels in an antenna array of the network device is 32, a quantity of channel rows in the antenna array is 2, a quantity of channel columns in the antenna array is 8, and the antenna array is a dual-polarized antenna array. In this case, the antenna array is a dual-polarized antenna array whose dimension is two rows and eight columns, and a dimension of a corresponding first matrix is 32×32, that is, 32 rows and 32 columns.

S203. Average, based on the first matrix, channels in different rows of the antenna array to obtain a second matrix, where a dimension of the second matrix is $N/(x \times R)$ rows and $N/(x \times R)$ columns; N, R, and x are all positive integers; R represents a quantity of channel rows of the antenna array; x represents polarization of the antenna array; and when the antenna array is a single-polarized antenna array, x is 1; or when the antenna array is a dual-polarized antenna array, x is 2.

The dimension of the first matrix is N×N. The dimension of the second matrix is $N/(x \times R)$ rows and $N/(x \times R)$ columns. For example, a quantity of channels of an antenna of the network device is 32, a quantity of channel rows of the antenna is 2, a quantity of channel columns of the antenna is 8, and the antenna is a dual-polarized antenna. In this case, the dimension of the first matrix is 32 rows and 32 columns, that is, 32×32, and the dimension of the second matrix is $32/(2 \times 2)$ rows and $32/(2 \times 2)$ columns, that is, 8×8. Because the dimension of the second matrix is reduced compared with the dimension of the first matrix, during data processing, a data amount is reduced, and therefore data processing efficiency can be improved. In addition, the second matrix is obtained by averaging the channels in the different rows of the antenna array based on the first matrix. In this way, impact of related interference between antenna channel rows can be effectively reduced. Consequently, weight value performance can be improved.

When the data processing method provided in this embodiment of this application is used to process data, the dimension of the second matrix is not only related to the quantity of channels of the antenna array, but also related to a quantity of channel rows of the antenna array and polarization of the antenna array. Compared with the dimension of the first matrix being related only to the quantity of channels of the antenna array, information considered in the second matrix obtained in this embodiment of this application is more comprehensive. In addition, the dimension of the first matrix is reduced based on the quantity of channel rows of the antenna array and polarization of the antenna array. When the dimension of the first matrix is reduced, a calculation amount during data processing is reduced. Therefore, data processing efficiency is also improved. In addition, because the second matrix is obtained by averaging the channels in the different rows of the first matrix, impact of related interference between rows is reduced, and the weight value performance can be effectively improved.

Figure 3:
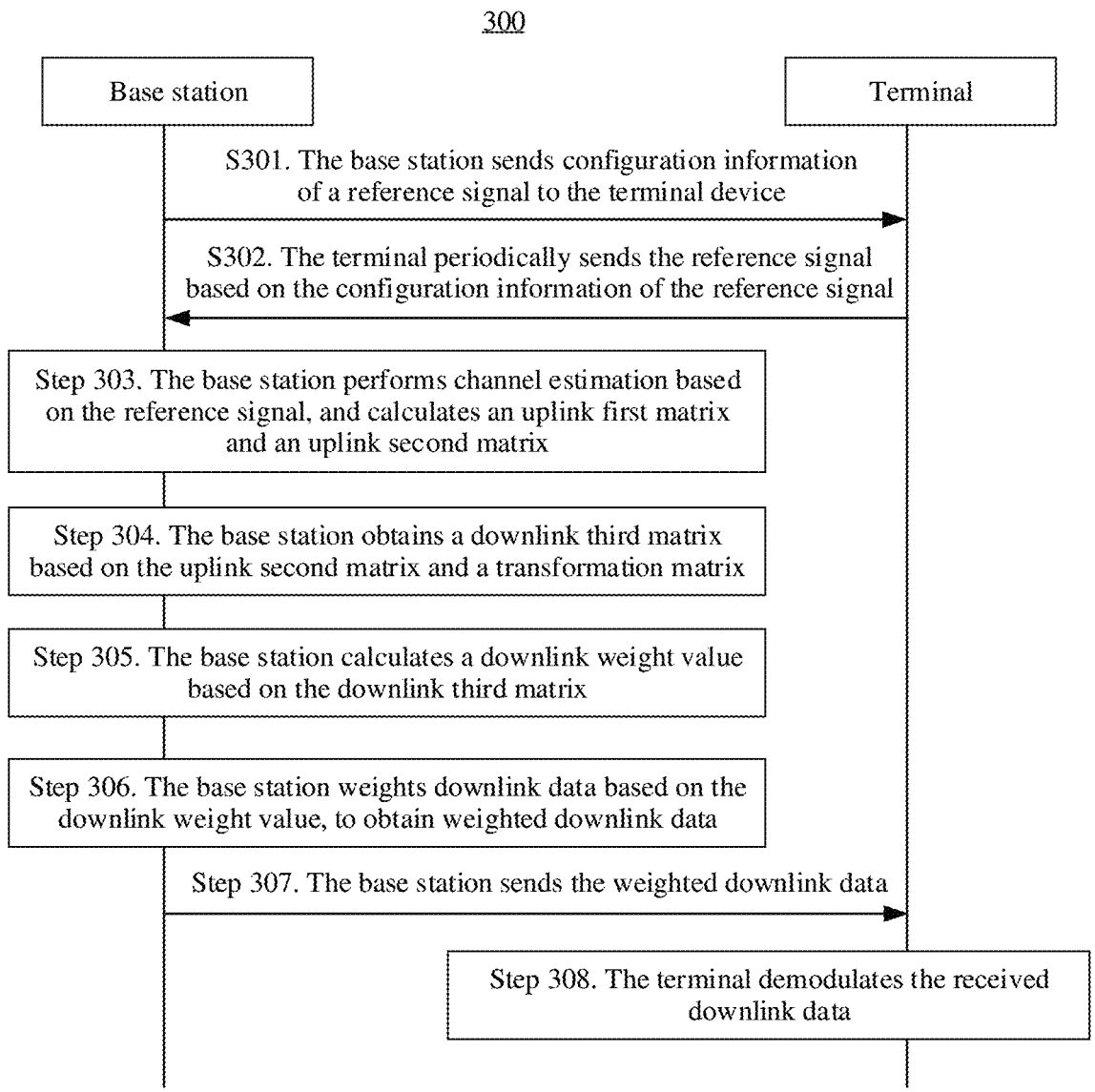
FIG. 3 is a schematic flowchart of a data processing method according to an embodiment of this application.

Refer to FIG. 3. FIG. 3 is a schematic flowchart of a data processing method 300 according to an embodiment of this application. In FIG. 3, downlink data processing is used as an example to specifically describe a data processing method applicable to this application. The data processing method is implemented through interaction between a base station and a terminal. The data processing method 300 includes but is not limited to the following steps.

S301. The base station sends configuration information of a reference signal to the terminal.

The configuration information of the reference signal may include a reference sending period, a reference signal class, and the like. This is not specifically limited herein.

S302. The terminal periodically sends the reference signal based on the configuration information of the reference signal.

The reference signal may be an SRS, a DMRS, or another reference signal. This is not specifically limited herein.

S303. The base station performs channel estimation based on the reference signal, and calculates an uplink first matrix and an uplink second matrix.

The base station performs channel estimation based on the reference signal to obtain the uplink first matrix. The first matrix is an autocorrelation matrix whose dimension is N rows and N columns, where N indicates a quantity of channels of an antenna array. The base station obtains the second matrix based on the first matrix, where the second matrix is obtained by averaging channels in the different rows of the antenna array based on the first matrix. A dimension of the second matrix is N/(x×R) rows and N/(x×R) columns, where N, R, and x are positive integers; R represents a quantity of channels in the antenna array; and x represents polarization of the antenna array. When the antenna array is a single-polarized antenna array, x is 1. When the antenna array is a dual-polarized antenna array, x is 2.

For example, a total of channels in the antenna array of the base station is 32, where a quantity of channel rows in the antenna array is 2, a quantity of channel columns in the antenna array is 8, and the antenna array is a dual-polarized antenna. The base station performs channel estimation based on the reference signal to obtain a channel coefficient H, where the channel coefficient H is a column vector of 32×1; and performs an autocorrelation operation on the channel coefficient H to obtain an uplink first matrix $R_{u1}$, where the first matrix $R_{u1}$ is an autocorrelation matrix with a dimension of 32×32 (that is, 32 rows and 32 columns). The base station averages, based on the first matrix, the channels in the different rows of the antenna array to obtain a second matrix $R_{u2}$, where a dimension of the second matrix $R_{u2}$ is 8×8, that is, eight rows and eight columns.

In an optional manner, singular value decomposition (SVD) is performed on the first matrix, and an eigenvalue less than a preset threshold is set to zero, to obtain a corrected first matrix. The base station averages, based on the corrected first matrix, the channels in the different rows of the antenna array, to obtain the second matrix.

The preset threshold may be defined as a specific proportion of a sum of all eigenvalues (for example, a result of multiplying the sum of all the eigenvalues by a coefficient a2), where an eigenvalue is less than the sum of all the eigenvalues. The corresponding proportion may be preset, and preferably, may be 1%.

For example, SVD decomposition is performed on the first matrix:

$$R_{U1} = U_{UL} \sum\nolimits_{UL} U_{UL}^H \quad (1)$$

Herein, $\Sigma_{UL}$ is a diagonal matrix; $U_{UL}$ is a unitary matrix; and $U_{UL}^H$ is a conjugate transpose of $U_{UL}$. A main diagonal element in $\Sigma_{UL}$ is an eigenvalue. A value of the main diagonal element less than the preset threshold in $\Sigma_{UL}$ is set to zero, and then the corrected first matrix is obtained by performing left multiplication on $U_{UL}$ and right multiplication on $U_{UL}^H$.

Performing SVD on the uplink first matrix can effectively reduce mutual interference caused by actual sub-path energy leakage, reduce an impact of a correction error, and improve precision of the first matrix.

In an optional manner, the base station obtains, based on the first matrix and along a main diagonal of the first matrix, x×R matrices whose dimensions are N/(x×R) rows and N/(x×R) columns, and averages the x×R matrices whose dimensions are N/(x×R) rows and N/(x×R) columns, to obtain the second matrix. The first matrix may be the first matrix obtained through SVD correction, or may be a first matrix on which SVD correction is not performed.

Figure 4:
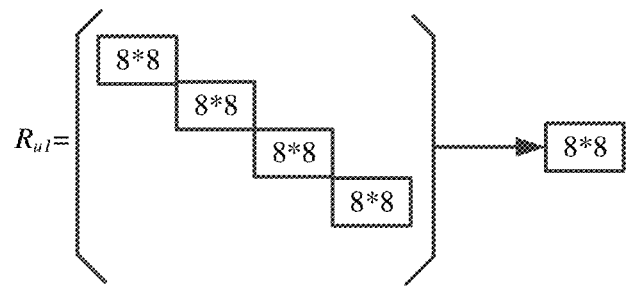
FIG. 4 is a block diagram of a method for obtaining a second matrix according to an embodiment of this application.

For example, refer to FIG. 4. FIG. 4 is a block diagram of a method for obtaining the second matrix according to an embodiment of this application. The dimension of the first matrix $R_{u1}$ is 32×32, that is, 32 rows and 32 columns. The total of channels in the antenna array corresponding to the first matrix is 32. The antenna array includes two row channels and eight column channels. The antenna array is dual-polarized, that is, N is 32, R is 2, and x is 2. The base station may obtain four 8×8 (that is, eight rows and eight columns) matrices along a main diagonal of $R_{u1}$, where all the matrices are co-polarized and are in a same row in the antenna array. The four matrices are averaged to obtain a second matrix $R_{u2}$, where a dimension of the second matrix $R_{u2}$ is 8×8, that is, eight rows and eight columns.

In the method for obtaining the second matrix based on the first matrix in this embodiment of this application, the second matrix has a lower matrix dimension than the first matrix. Therefore, data processing complexity is reduced and data processing efficiency is improved. In addition, because the channels in the different rows of the antenna array are averaged based on the first matrix, impact of related interference between rows of the antenna array is reduced, and then precision of the second matrix is improved.

S304. The base station obtains a downlink third matrix based on the uplink second matrix and a transformation matrix.

For example, the base station multiplies the second matrix by the transformation matrix to obtain the downlink third matrix:

$$R_d = TR_{u2} \quad (2)$$

Herein, $R_d$ is the downlink third matrix, T is the transformation matrix, and $R_{u2}$ is the uplink second matrix.

The transformation matrix is related to an uplink frequency and a downlink frequency, and is a link between the uplink second matrix and the downlink third matrix. The base station may perform correlation matrix transformation of an uplink channel and a downlink channel based on a frequency difference between the uplink frequency and the downlink frequency. In addition, the transformation matrix may be related to another parameter, for example, an element arrangement of the antenna array, an element structure of the antenna array, an element spacing of the antenna array, and phase and amplitude information of radiation of different elements. This is not specifically limited herein. The element arrangement of the antenna may be an arrangement form of antenna elements, for example, whether the elements are arranged in a linear array or a planar array. The element structure of the antenna may be a radiation condition of the elements. The element spacing of the antenna indicates a row spacing between the antenna elements.

The transformation matrix may be obtained based on an actual pattern of the antenna channels and a preset mathematical theorem, where the preset mathematical theorem is a projection theorem or a series theorem. A simple deduction of the transformation matrix may be as follows.

The uplink second matrix may be represented as:

$$R_{u2} = \int \rho(\theta) a^u(\theta) a^u(\theta)^H d\theta \quad (3)$$

Herein, $R_{u2}$ is the uplink second matrix, $\rho(\theta)$ is a sub-path angle power, $\rho(\theta) \in \mathbb{R}$, $a^u(\theta)$ is a steering vector of an uplink sub-path, and θ is an angle of arrival of a sub-path. The formula (3) may be further converted into the following form:

$$r_m^u = \int_{-\pi}^{\pi} \rho(\theta) g_m^u(\theta) d\theta \quad m = 1 \ldots M, M = 2N^2 \quad (4)$$

Herein, $r_m^u$ belongs to $\mathbb{R}$ and is an element of $r^u=\text{vec}([\mathcal{R}(R_{u2}) \mathcal{J}(R_{u2})])$, $r^u$ is a column vector of $R_{u2}$ obtained through expansion based on a real part and an imaginary part, m is a correlation element index, and similarly, $g_m^u(\theta)$ is a vectorized element of $a^u(\theta)a^u(\theta)^H$. In actual application, $r^u$ does not need to be represented by using $2N^2$ elements. This is because $R^u$ has a structure characteristic, that is, satisfies a Hermitian (Hermitian) characteristic, a Toeplitz (Toeplitz) characteristic, or the like. The Hermitian matrix is also referred to as a self-adjoint matrix. In the matrix, an element in an $i^{th}$ row and a $j^{th}$ column is equal to a complex conjugate of an element in a $j^{th}$ row and an $i^{th}$ column. In the Toeplitz matrix, elements on a main diagonal are equal, elements on a line parallel to the main diagonal are also equal, and elements in the matrix are symmetric with respect to a secondary diagonal.

Let $\mathcal{H}$ be Hilbert (Hilbert) space of a real function defined in a domain $L^2(-\pi, \pi)$, and an inner product thereof may be indicated by using the following formula:

$$\langle f, g \rangle = \int_{-\pi}^{\pi} f(\theta) g(\theta) d\theta \quad (5)$$

Herein, $f(\theta)$ and $g(\theta)$ are members of $\mathcal{H}$.

Let $\rho, g_m^u$ be a member of $\mathcal{H}$. Then $$r_m^u = \langle \rho, g_m^u \rangle \quad m = 1 \ldots M \quad (6)$$

Solving for ρ may be expressed as the following problem:

$$\text{search for } \rho^* \in V = \cap_{m=1}^M V_m \quad (7)$$
$$V_m = \{\rho \in \mathcal{H} : \langle \rho, g_m^u \rangle = r_m^u\} \quad m = 1 \ldots M$$

Take a least-norm solution of an element in V, that is, $$\hat{\rho} = \arg\min_{\rho^* \in V} \|\rho^*\| \quad (8)$$

According to a vector space theory, space V may be represented in the following form of a linear variety (Linear Variety):

$$V = \rho^* + \text{span}(g_1^u, \ldots, g_M^u)^\perp = \rho^* + W \quad (9)$$

Herein, $\text{span}(g_1^u, \ldots, g_M^u)^\perp$ represents an orthogonal space of span of $(g_1^u, \ldots, g_M^u)$.

According to the formula (9), it is easy to verify that when $\rho'=\rho++g'$, where $g' \in \text{span}(g_1^u, \ldots, g_M^u)^\perp$. In this case, $$\langle \rho', g_m^u \rangle = \quad (10)$$
$$\int_{-\pi}^{\pi} \rho'(\theta) g_m^u(\theta) d\theta = \int_{-\pi}^{\pi} \rho^*(\theta) g_m^u(\theta) d\theta + \int_{-\pi}^{\pi} g'(\theta) g_m^u(\theta) d\theta = r_m^u$$

When $W=\text{span}(g_1^u, \ldots, g_M^u)^\perp$, and $V=\rho^*+W$, a minimum solution of $\|\rho^*\|$ is a projection of $\rho^*$ on $W^\perp$, and $P_{W^\perp}(\rho^*)=P_V(0)$.

The following proves that when the minimum solution of $\|\rho^*\|$ is the projection of $\rho^*$ on $W^\perp$, that is, if $w_0=\arg\min_{w \in W} \|\rho^*+w\|$, $(\rho^*+w_0) \perp W$, where $w_0$ is a specified value and is mainly used to prove the foregoing conclusion.

It is assumed that $\hat{\rho}=\rho^*+w_0$, that is $\hat{\rho} \in W^\perp$, $W^\perp = \text{span}(g_1^u, \ldots, g_M^u)$, and then $\hat{\rho}$ may be expressed as:

$$\hat{\rho} = \sum_{m=1}^{M} \alpha_m g_m^u \quad (11)$$

Herein, $\alpha_m$ is a coefficient representing each component of $\hat{\rho}$ projected to the space $(g_1^u, \ldots, g_M^u)$.

According to a projection theorem of vector space, the following can be learned.

$$\langle \rho^* - \hat{\rho}, g_m^u \rangle = \langle \rho^* - \sum_{m=1}^{M} \alpha_m g_m^u, g_m^u \rangle = 0, m = 1 \ldots M \quad (12)$$

Through expansion, the following is obtained.

$$\langle g_1^u, g_1^u \rangle \alpha_1 + \langle g_2^u, g_1^u \rangle \alpha_2 + \ldots + \langle g_M^u, g_1^u \rangle \alpha_M = \langle \rho^*, g_1^u \rangle = r_1^u \quad (13)$$
$$\langle g_1^u, g_2^u \rangle \alpha_1 + \langle g_2^u, g_2^u \rangle \alpha_2 + \ldots + \langle g_M^u, g_2^u \rangle \alpha_M = \langle \rho^*, g_2^u \rangle = r_2^u$$
$$\vdots$$
$$\langle g_1^u, g_M^u \rangle \alpha_1 + \langle g_2^u, g_M^u \rangle \alpha_2 + \ldots + \langle g_M^u, g_M^u \rangle \alpha_M = \langle \rho^*, g_M^u \rangle = r_M^u$$

Expression as a matrix is as follows.

$$r^u = G^u \alpha \quad (14)$$
$$\alpha = G^{u\dagger} r^u$$
$$G^u = \begin{bmatrix} \langle g_1^u, g_1^u \rangle & \langle g_2^u, g_1^u \rangle & \ldots & \langle g_M^u, g_1^u \rangle \\ \langle g_1^u, g_2^u \rangle & \langle g_2^u, g_2^u \rangle & \ldots & \langle g_M^u, g_2^u \rangle \\ \vdots & \vdots & \ddots & \vdots \\ \langle g_1^u, g_M^u \rangle & \langle g_2^u, g_M^u \rangle & \ldots & \langle g_M^u, g_M^u \rangle \end{bmatrix}$$
$$\alpha = [\alpha_1, \alpha_2, \ldots, \alpha_M]^T$$

A corrected downlink third matrix element is:

$$r_m^d = \langle \hat{\rho}, g_m^d \rangle = \left\langle \sum_{m=1}^{M} \alpha_m g_m^u g_l^d \right\rangle = \sum_{m=1}^{M} \alpha_m \langle g_m^u g_l^d \rangle, l = 1 \ldots M \quad (15)$$

Herein, $r_m^d$ belongs to $\mathbb{R}$ and is an element of $r^d=\text{vec}([\mathcal{R}(R^d) \mathcal{J}(R^d)])$, $r^d$ is a column vector of $R^d$ obtained through expansion based on a real part and an imaginary part, m is a correlation element index, and $R^d$ is a downlink autocorrelation matrix. $g_l^d(\theta)$ is a vectorized element of $a^d(\theta)a^d(\theta)^H$.

Expression as a matrix is as follows.

$$r^d = Qa = QG^{u\dagger}r^u \quad (16)$$

$$Q = \begin{bmatrix} \langle g_1^u, g_1^d \rangle & \langle g_2^u, g_1^d \rangle & \cdots & \langle g_M^u, g_1^d \rangle \\ \langle g_1^u, g_2^d \rangle & \langle g_2^u, g_2^d \rangle & \cdots & \langle g_M^u, g_2^d \rangle \\ \vdots & \vdots & \ddots & \vdots \\ \langle g_1^u, g_M^d \rangle & \langle g_2^u, g_M^d \rangle & \cdots & \langle g_M^u, g_M^d \rangle \end{bmatrix}$$

It can be deduced from the above that the transformation matrix is as follows.

$$T = QG^{u\dagger} \quad (17)$$

The transformation matrix T includes $g_1^u$ and $g_1^d$. In other words, the transformation matrix T is related to uplink and downlink steering vectors. The steering vector is related to a frequency. Therefore, the transformation matrix is related to uplink and downlink frequencies. Optionally, because the steering vector may be further related to the element arrangement of the antenna, the element structure of the antenna, the element spacing of the antenna, phase and amplitude information of radiation of different elements, and the like, the transformation matrix is also related to the foregoing parameters.

In an optional manner, the base station performs SVD on the transformation matrix T, and sets an eigenvalue less than a preset threshold to zero, to obtain a corrected transformation matrix. The foregoing SVD performed on the transformation matrix can effectively reduce mutual interference caused by actual sub-path energy leakage, reduce an impact of a correction error, and improve precision of the transformation matrix. Consequently, weight value performance is improved.

In an optional manner, in a process in which the base station obtains the downlink third matrix based on the uplink second matrix and the transformation matrix, when a sub-path power included in the uplink second matrix is a negative number, the sub-path power is set to zero. By forcibly adjusting the sub-path angle power to zero, an impact caused by a negative power path can be effectively reduced, and precision of the downlink third matrix can be effectively improved. Consequently, the weight value performance is improved.

For reducing the impact caused by the sub-path angle power on the downlink third matrix, refer to the following algorithm 1 and algorithm 2.

Optionally, algorithm 1: When the uplink second matrix is obtained, and a fitting power obtained during fitting of the sub-path angle power is less than 0, the sub-path angle power is forcibly adjusted to 0.

$$\hat{\rho} = \sum_{m=1}^{M} \alpha_m g_m^u \quad (18)$$

As shown in formula (18), $\hat{\rho}$ represents a fitting value of the sub-path angle power, but during calculation, a correlation value is not effectively limited to zero. In this case, a correction error is caused.

The following formula is used.

$$r^u = G^u \alpha \quad (19)$$

$$\alpha = G^{u\dagger} r^u$$

When $\alpha$ is obtained, $\hat{\rho}$ values of different sub-paths are calculated. If a corresponding value is a negative value, the corresponding value is set to zero.

$$\begin{cases} \rho = \hat{\rho}, & \hat{\rho} \geq 0 \\ \rho = 0, & \hat{\rho} < 0 \end{cases} \quad (20)$$

$$r_m^d = \langle \hat{\rho}, g_m^d \rangle = \left\langle \sum_{m=1}^{M} \alpha_m g_m^u, g_l^d \right\rangle = \sum_{m=1}^{M} \alpha_m \langle g_m^u, g_l^d \rangle, l = 1 \ldots M$$

By forcibly adjusting the sub-path angle power to zero, an impact on system performance caused by a negative power path can be effectively reduced, and precision of the downlink third matrix can be improved. Consequently, the weight value performance is improved.

Algorithm 2: Forcibly adjust the sub-path angle power to zero based on the series theorem.

The Fourier series is used to calculate the transformation matrix.

$$R_u = \sum_{i=1}^{p} f^2(\theta_i)|\alpha_i|^2 a_u(\theta_i) a_u^H(\theta_i) \quad (21)$$

$$R_d = \sum_{i=1}^{p} f^2(\theta_i)|\alpha_i|^2 a_d(\theta_i) a_d^H(\theta_i) \quad (22)$$

Herein, $R_u$ is an uplink autocorrelation matrix, $R_d$ is a downlink autocorrelation matrix, $\alpha_i$ is a sub-path power coefficient, $f(\theta_i)$ is antenna gain at an angle $\theta_i$ in an antenna pattern, $a_u(\theta_i)$ is an uplink sub-path steering vector, and $a_d(\theta_i)$ is a downlink sub-path steering vector.

It is assumed that sub-paths with a same delay are evenly distributed within an angle range $$\left(\phi - \frac{\Delta}{2}, \phi + \frac{\Delta}{2}\right),$$

a multipath quantity p is large, and $\theta_i$ is densely distributed within a angle range $$\left(\phi - \frac{\Delta}{2}, \phi + \frac{\Delta}{2}\right).$$

In this case, $$R_u = \int_{-\pi/S}^{\pi/S} \sigma(\theta) a_u(\theta) a_u^H(\theta) d\theta \quad (23)$$

$$R_d = \int_{-\pi/S}^{\pi/S} \sigma(\theta) a_d(\theta) a_d^H(\theta) d\theta \quad (24)$$

Herein, $\sigma(\theta)$ is a multipath density function, S is a parameter for integral angle range control, and $\sigma(\theta)$ is a continuous function in a domain of definition $\left(\phi - \frac{\Delta}{2}, \phi + \frac{\Delta}{2}\right)$ and satisfies the following formula:

$$\sigma(\theta) = \begin{cases} \frac{p}{\Delta} f^2(\theta_i)|\alpha_i|^2, & \theta = \theta_i, i = 1, \ldots, p \\ 0, & |\theta - \phi| > \Delta/2. \end{cases} \quad (25)$$

Herein, $\sigma(\theta)$ is replaced with a periodic function $\sigma_1(\theta)$ with a period of $2\pi/S$ and is used as a basis function, and the formulas (23) (24) are still true. $\sigma_1(\theta)$ may be expressed as:

$$\sigma_1(\theta) = \sum_{k=-\infty}^{\infty} c(k)e^{-jkS\theta} \quad (26)$$

$$c(k) = \frac{S}{2\pi} \int_{-\pi/S}^{\pi/S} \sigma_1(\theta)e^{jkS\theta} \quad (27)$$

K-order approximation is performed on $\sigma_1(\theta)$: $\sigma_1(\theta) = \Sigma_{k=-K}^{K} c(k)e^{-jkS\theta}$, and then the formulas (23) (24) may be expressed as:

$$R_u = \sum_{k=-K}^{K} c(k)Q_u^{(k)} \quad (28)$$

$$R_d = \sum_{k=-K}^{K} c(k)Q_d^{(k)} \quad (29)$$

where $$Q_u^{(k)} = \int_{-\pi/S}^{\pi/S} a_u(\theta)a_u^H(\theta)e^{-jkS\theta}d\theta \quad (30)$$

$$Q_d^{(k)} = \int_{-\pi/S}^{\pi/S} a_d(\theta)a_d^H(\theta)e^{-jkS\theta}d\theta \quad (31)$$

where $k = -K, -K+1, \ldots, K$.

$$r_u = R_u(:) \quad r_d = R_d(:) \quad (32)$$

$$Q_u = [Q_u^{(-K)}(:), Q_u^{(-K+1)}(:), \ldots, Q_u^{(K)}(:)] \quad (33)$$

$$Q_d = [Q_d^{(-K)}(:), Q_d^{(-K+1)}(:), \ldots, Q_d^{(K)}(:)] \quad (34)$$

In this case, $$Q_u c = r_u \quad Q_d c = r_d \quad (35)$$

where $c = [c(-K), c(-K+1), \ldots, c(K)]^T$. Selection of K satisfies full column rank of $Q_u$. In this case, $$r_d = Ar_u \quad (36)$$

$$A = Q_d(Q_u^H Q_u)^{-1} Q_u^H \quad (37)$$

Herein, A is a matrix of $m^2 \times m^2$. A can be considered as a simple frequency correction matrix (FC matrix).

$$Q_u^{(k)}(m_1, m_2) = \int_{\frac{\pi}{S}}^{\frac{\pi}{S}} e^{jz_u(m_1-m_2)\sin(\theta) - jkS\theta}d\theta = \quad (38)$$

$$\int_{\frac{\pi}{S}}^{\frac{\pi}{S}} [\cos(z_u(m_1 - m_2)\sin(\theta))\cos(kS\theta) + \sin(z_u(m_1 - m_2)\sin(\theta))\sin(kS\theta)]d\theta +$$

$$j\int_{\frac{\pi}{S}}^{\frac{\pi}{S}} [\sin(z_u(m_1 - m_2)\sin(\theta))\cos(kS\theta) -$$

$$\cos(z_u(m_1 - m_2)\sin(\theta))\sin(kS\theta)]d\theta$$

Herein, $z_u = 2\pi f_u z/c$, because an imaginary part of $Q_u^{(k)}(m_1, m_2)$ is an odd function integral of $\theta$, $Q_u^{(k)}(m_1,m_2)$ is a real value. A same calculation manner may be used for $Q_d^{(k)}(m_1, m_2)$, and $z_d = 2\pi f_d z/c$.

The following features can be obtained.

$$Q_{u/d}^{(-k)}(m_2, m_1) = Q_{u/d}^{(k)}(m_1, m_2) \quad (39)$$

$$Q_{u/d}^{(0)}(m_2, m_1) = Q_{u/d}^{(0)}(m_1, m_2)$$

$$Q_{u/d}^{(0)}(m, m) = \frac{2\pi}{S}, Q_{u/d}^{(k)}(m, m) = 0 \text{ for } k \neq 0$$

$$Q_{u/d}^{(k)}(m_1 + m, m_2 + m) = Q_{u/d}^{(k)}(m_1, m_2)$$

Because $c(k), k = -K, -K+1, \ldots, K$, in order to obtain a unique solution of $c(k)$, full column rank of $Q_u$ is required. $R_u$ and $R_d$ satisfy Hermitian and Toeplitz characteristics, and therefore can be defined as linear space of a $(2m-1)$ dimension. When symmetry of $Q_u$ and $Q_d$ is considered, $c(-k)=c^*(k)$ for $k=1, 2, \ldots, K$. An unknown quantity of c should be limited to $2m-1$. Therefore, K is required to be less than or equal to $m-1$. $\sigma_1(\theta)$ is obtained by shortening the Fourier series, and larger K indicates better approximate performance. Therefore, $K=m-1$.

A simplified solution is as follows.

$$c_r = R([c(0), c(1), \ldots c(m)])^T \quad (40)$$

$$c_i = T([c(1), \ldots c(m)])^T \quad (41)$$

$$p_{u,r} = R([R_u(1, 1), R_u(2, 1), \ldots, R_u(m, 1)])^T \quad (42)$$

$$p_{u,i} = R([R_u(2, 1), R_u(2, 1), \ldots, R_u(m, 1)])^T \quad (43)$$

In this case, $$Q_{u/d,r} c_r = p_{u/d,r} \quad Q_{u/d,i} c_i = p_{u/d,i} \quad (44)$$

In this way:

$$p_{d,r} = B_r p_{u,r} \quad p_{d,i} = B_i p_{u,i} \quad (45)$$

where $$B_r = Q_{d,r} Q_{u,r}^{-1} \quad B_i = Q_{d,i} Q_{u,i}^{-1} \quad (46)$$

Herein, $c_r$ indicates a real part vector of vectors, $c_i$ indicates an imaginary part vector of the vectors, $p_{u,r}$ indicates a real part vector of an autocorrelation matrix, and $p_{u,i}$ is an imaginary part vector of the autocorrelation matrix.

$$Q_{u/d,r} = \quad (47)$$

$$\begin{bmatrix} Q_u^{(0)}(1,1) & Q_u^{(-1)}(1,1)+Q_u^{(1)}(1,1) & \cdots & Q_u^{(-m+1)}(1,1)+Q_u^{(m-1)}(1,1) \\ Q_u^{(0)}(2,1) & Q_u^{(-1)}(2,1)+Q_u^{(1)}(2,1) & \cdots & Q_u^{(-m+1)}(2,1)+Q_u^{(m-1)}(2,1) \\ \vdots & \vdots & \cdots & \vdots \\ Q_u^{(0)}(m,1) & Q_u^{(-1)}(m,1)+Q_u^{(1)}(m,1) & \cdots & Q_u^{(-m+1)}(m,1)+Q_u^{(m-1)}(m,1) \end{bmatrix}$$

$$Q_{u/d,r} = \begin{bmatrix} Q_u^{(-1)}(2,1)+Q_u^{(1)}(2,1) & \cdots & Q_u^{(-m+1)}(2,1)+Q_u^{(m-1)}(2,1) \\ \vdots & \cdots & \vdots \\ Q_u^{(-1)}(m,1)+Q_u^{(1)}(m,1) & \cdots & Q_u^{(-m+1)}(m,1)+Q_u^{(m-1)}(m,1) \end{bmatrix} \quad (48)$$

Hermitian and Toeplitz operations are performed only on $R_u$. After the operations, a dimension of $R_u$ may not change or may be reduced.

In this way, the impact on the system performance caused by the negative power path can be effectively reduced, and the precision of the downlink third matrix can be improved. Consequently, the weight value performance is improved.

S305. The base station calculates a downlink weight value based on the downlink third matrix.

In an optional manner, the base station may calculate the downlink weight value based on a downlink third matrix, a precoding matrix indication (PMI), and channel quality information (CQI).

In an optional manner, the base station may obtain a corrected weight value based on the third matrix, and obtain a signal increment and an interference increment by using the third matrix and the corrected weight value. The weight value performance is determined by determining whether signal energy of a target user is greater than a third preset threshold and whether an increment of interference by the target user to another user is greater than a fourth preset threshold.

This embodiment of this application provides an indicator for determining that interference to a neighboring user that is simultaneously scheduled does not significantly increase while the weight value performance significantly increases. Usually, correlation between a weight value and a channel autocorrelation matrix indicates correlation between the weight value and a channel. If the weight value is from a signal, the higher the weight value, the better. If the weight value is from interference, the lower the weight value, the better.

$$Coef(i,k) = |W_k^H R_i W_k| \quad (49)$$

Herein, $W_k$ is a weight value, and $R_i$ is an autocorrelation matrix of a downlink channel or an uplink channel of a user i. Herein, i may be understood as an index of the user, that is, an index of a terminal or a base station, and k may also be understood as an index of a user. The user k and the user i are not a same user. Coef(i, k), that is, the foregoing indicator may be used to determine that while CSI correction significantly increases data weight value precision, it is ensured that interference to a neighboring MC user that is simultaneously scheduled does not significantly increase.

S306. The base station weights downlink data based on the downlink weight value, to obtain weighted downlink data.

S307. The base station sends the weighted downlink data to the terminal.

S308. The terminal demodulates the received downlink data.

When the data processing method provided in embodiments of this application is used to process data, the dimension of the second matrix is not only related to the quantity of channels of the antenna array, but also related to a quantity of channel rows of the antenna array and polarization of the antenna array. Compared with the dimension of the first matrix being related only to the quantity of channels of the antenna array, information considered in the second matrix obtained in this embodiment of this application is more comprehensive. In addition, the dimension of the first matrix is reduced based on the quantity of channel rows of the antenna array and polarization of the antenna array. When the dimension of the first matrix is reduced, a calculation amount during data processing is reduced. Therefore, data processing efficiency is also improved. In addition, because the second matrix is obtained by averaging the channels in the different rows of the first matrix, impact of related interference between rows is reduced. Consequently, the weight value performance can be effectively improved.

Figure 5:
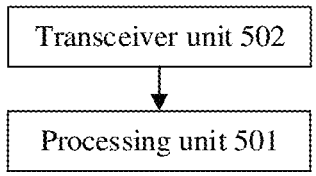
FIG. 5 is a block diagram of a communication apparatus according to an embodiment of this application.

Refer to FIG. 5. FIG. 5 is a block diagram of a communication apparatus according to an embodiment of this application. The communication apparatus may be understood as a network device, for example, a TRP or gNB, or may be understood as a module (for example, a chip) in a network device, or may be understood as a terminal device, for example, user UE or a vehicle-mounted device, or may be understood as a module (for example, a chip) in a terminal device. This is not specifically limited in this application. The communication apparatus may include a processing unit 501 and a transceiver unit 502.

It should be understood that the foregoing transceiver unit may be referred to as an input/output unit, a communication unit, or the like. When the communication apparatus is a terminal device, the input/output unit may be a transceiver, and the processing unit may be a processor. When the communication apparatus is a module (for example, a chip) in a terminal device, the input/output unit may be an input/output interface, an input/output circuit, an input/output pin, or the like, and may also be referred to as an interface, a communication interface, an interface circuit, or the like. The processing unit may be a processor, a processing circuit, a logic circuit, or the like.

The transceiver unit 502 is configured to receive a reference signal.

The processing unit 501 is configured to: obtain a first matrix based on the reference signal, where the first matrix is an autocorrelation matrix whose dimension is N rows and N columns, and N indicates a quantity of channels of an antenna array; and average, based on the first matrix, channels in different rows of the antenna array to obtain a second matrix, where a dimension of the second matrix is N/(x×R) rows and N/(x×R) columns; N, R, and x are all positive integers; R represents a quantity of channel rows of the antenna array; x represents polarization of the antenna array; and when the antenna array is a single-polarized antenna array, x is 1; or when the antenna array is a dual-polarized antenna array, x is 2.

The reference signal may be an SRS, a CSI-RS, or a DMRS, or may be another reference signal. A network device or a terminal device measures the reference signal, estimates a channel status, and obtains a first matrix related to the channel status. If the operation is performed by the network device, the first matrix is an uplink channel autocorrelation matrix. If the operation is performed by the terminal device, the first matrix is a downlink channel autocorrelation matrix.

Usually, the dimension of the first matrix is related to the quantity of channels of the antenna array. For example, if a quantity of channels of an antenna array of the network device is 32, a dimension of a first matrix is 32×32, that is, 32 rows and 32 columns. In this manner, the dimension of the first matrix is large, and calculation complexity is high. In this application, when a dimension of the second matrix is obtained, not only the quantity of channels of the antenna array is considered, but also a quantity of channel rows of the antenna array and a polarization status of the antenna array may be considered. For example, if a quantity of channels of an antenna array of the network device is 32, a quantity of channel rows of the antenna array of the network device is 2, and the antenna array is a dual-polarized antenna array, a dimension of a second matrix is 32/(2×2) rows and 32/(2×2) rows, that is, 8 rows and 8 columns. The dimension of the second matrix obtained in this application is low. Therefore, during data calculation, a data amount is small, and data processing efficiency is high. In addition, because the channels between different rows of the antenna array are averaged based on the first matrix, impact of related interference between channel rows of the antenna array is reduced, and precision of the second matrix is improved. Consequently, weight value performance is improved.

In an optional manner, the processing unit 501 is configured to: obtain, along a main diagonal of the first matrix, x×R matrices whose dimensions are N/(x×R) rows and N/(x×R) columns, and average the x×R matrices whose dimensions are N/(x×R) rows and N/(x×R) columns, to obtain the second matrix.

It should be noted that the x×R matrices whose dimensions are N/(x×R) rows and N/(x×R) columns obtained according to the foregoing method are matrices of the antenna array that are co-polarized and that are in a same row. The second matrix is obtained by averaging the matrices that are co-polarized and that are in a same row. In this case, impact of related interference between rows is reduced, and precision of the second is improved. Consequently, the weight value performance is improved.

In an optional manner, the processing unit 501 is further configured to: obtain a third matrix based on the second matrix and a transformation matrix, where the transformation matrix is related to an uplink frequency and a downlink frequency, and the third matrix is a product of the transformation matrix and the second matrix; and obtain a weight value based on the third matrix, and weight data based on the weight value.

In an optional manner, the transformation matrix may be obtained based on an actual pattern of the channels of the antenna array and a preset mathematical theorem, where the preset mathematical theorem is a projection theorem or a series theorem.

The transformation matrix is obtained based on the actual pattern of the antenna channels and the preset mathematical theorem, so that precision of the transformation matrix can be ensured. When precision of the transformation matrix is high, the third matrix obtained based on the transformation matrix is precise. When calculation is performed based on the precise third matrix, the weight value performance can be improved.

In an optional manner, the processing unit 501 is further configured to: perform SVD based on the first matrix, and set an eigenvalue less than a first preset threshold to zero, so as to obtain a corrected first matrix; and obtain a second matrix based on the corrected first matrix. By performing SVD and setting a small eigenvalue to zero (in other words, removing an eigenvalue less than the first preset threshold), an error caused by insufficient statistics of the first matrix can be reduced. In this way, precision of the first matrix is improved. Consequently, the weight value performance is improved.

In an optional manner, the processing unit 501 is further configured to: perform SVD based on the transformation matrix, and set an eigenvalue less than a second preset threshold to zero, so as to obtain a corrected transformation matrix; and obtain the third matrix based on the second matrix and the transformation matrix. By performing SVD and setting a small eigenvalue to zero (in other words, removing an eigenvalue less than the second preset threshold) on the transformation matrix, an impact of cross-correlation between sub-paths in the transformation matrix can be reduced. In this way, precision of the transformation matrix is improved. Consequently, the weight value performance is improved.

In an optional manner, the processing unit 501 is further configured to: when a sub-path power included in the second matrix is a negative number, set the sub-path power to zero. By setting the negative sub-path power to zero, an impact on performance caused by a negative power path can be effectively reduced, and precision of the third matrix can be improved. Consequently, the weight value performance is improved.

In an optional manner, the processing unit 501 is further configured to: obtain a signal increment and an interference increment based on the third matrix. According to an obtained channel increment and interference increment, whether to perform a correction operation may be adaptively selected, so as to obtain a better weight value.

In an optional manner, the processing unit 501 is further configured to obtain the first matrix based on the reference signal, where the reference signal includes one of the following: an SRS, a CSI-RS, or a DMRS.

Figure 6:
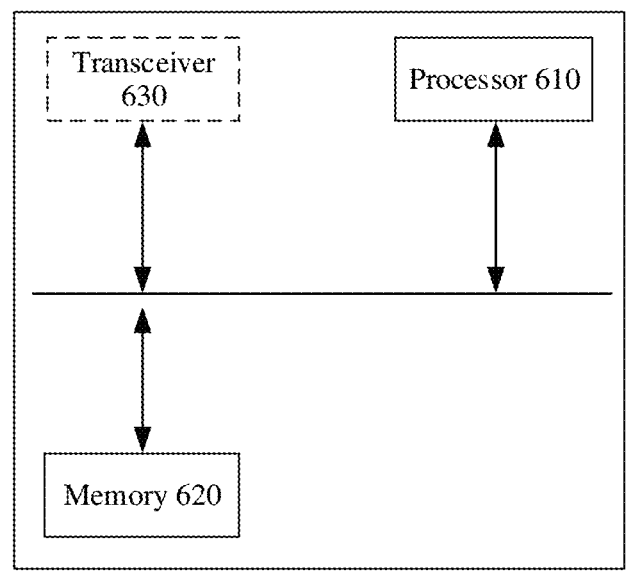
FIG. 6 is another block diagram of a communication apparatus according to an embodiment of this application.

Refer to FIG. 6. FIG. 6 is a block diagram of a communication apparatus according to an embodiment of this application. For example, the communication apparatus 600 may be a chip or a chip system. Optionally, in this embodiment of this application, the chip system may include a chip, or may include a chip and another discrete component.

The communication apparatus 600 may include at least one processor 610, and the communication apparatus 600 may further include at least one memory 620 configured to store a computer program, program instructions, and/or data. The memory 620 is coupled to the processor 610. The coupling in this embodiment of this application may be an indirect coupling or a communication connection between apparatuses, units, or modules in an electrical form, a mechanical form, or another form, and is used for information exchange between the apparatuses, the units, or the modules. The processor 610 may perform an operation in cooperation with the memory 620. The processor 610 may execute the computer program stored in the memory 620. Alternatively, the at least one memory 620 may be integrated with the processor 610.

Optionally, in actual application, the communication apparatus 600 may include or may not include a transceiver 630 represented by dashed lines in the figure. The communication apparatus 600 may exchange information with another device by using the transceiver 630. The transceiver 630 may be a circuit, a bus, a transceiver, or any other apparatus that may be configured to exchange information.

In a possible implementation, the communication apparatus 600 may be used in the foregoing terminal device, or may be the foregoing first communication apparatus, or may be the foregoing second communication apparatus. The memory 620 stores a necessary computer program, necessary program instructions, and/or necessary data for implementing the functions of the first communication apparatus or the second communication apparatus in any one of the foregoing embodiments. The processor 610 may execute the computer program stored in the memory 620, to complete the method in any one of the foregoing embodiments.

A specific connection medium between the transceiver 630, the processor 610, and the memory 620 is not limited in this embodiment of this application. In this embodiment of this application, in FIG. 6, the memory 620, the processor 610, and the transceiver 630 are connected by using a bus. The bus is indicated by using a thick line in FIG. 6. A connection manner of other components is merely an example for description, and imposes no limitations. The bus may be classified into an address bus, a data bus, a control bus, and the like. For ease of representation, only one thick line represents the bus in FIG. 6, but this does not mean that there is only one bus or only one type of bus. In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, or may be any conventional processor, or the like. The steps in the methods disclosed with reference to embodiments of this application may be directly performed by a hardware processor, or may be performed by a combination of hardware and a software module in the processor.

In embodiments of this application, the memory may be a non-volatile memory like a hard disk drive (HDD) or a solid-state drive (SSD), or may be a volatile memory (volatile memory) like a random-access memory (RAM). Alternatively, the memory may be any other medium that can be configured to carry or store expected program code in a form of an instruction or a data structure and that can be accessed by a computer, but is not limited thereto. Alternatively, the memory in embodiments of this application may be a circuit or any other apparatus that can implement a storage function, and is configured to store a computer program, program instructions, and/or data.

Based on the foregoing embodiments, an embodiment of this application further provides a readable storage medium. The readable storage medium stores instructions. When the instructions are executed, the method in any one of the foregoing embodiments is implemented. The readable storage medium may include any medium that can store program code, for example, a USB flash drive, a removable hard disk, a read-only memory, a random-access memory, a magnetic disk, or an optical disc.

A person skilled in the art should understand that embodiments of this application may be provided as a method, a system, or a computer program product. Therefore, this application may take the form of hardware only embodiments, software only embodiments, or embodiments with a combination of software and hardware. In addition, this application may take a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the apparatus (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more procedures in the flowcharts and/or in one or more blocks in the block diagrams.

These computer program instructions may be alternatively stored in a computer-readable memory that can indicate a computer or another programmable data processing apparatus to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing apparatus, so that a series of operation steps are performed on the computer or another programmable apparatus to generate computer-implemented processing. Therefore, the instructions executed on the computer or another programmable apparatus provide steps for implementing a specific function in one or more procedures in the flowcharts and/or in one or more blocks in the block diagrams.

What is claimed is:

1. A method, comprising:
   obtaining a reference signal fed back by a communication apparatus;
   obtaining a first matrix based on the reference signal, wherein the first matrix is an autocorrelation matrix whose dimension is N rows and N columns, and N indicates a quantity of channels of an antenna array; and
   averaging, based on the first matrix, channels in different rows of the antenna array to obtain a second matrix, wherein a dimension of the second matrix is $N/(x \times R)$ rows and $N/(x \times R)$ columns; N, R, and x are all positive integers, R represents a quantity of channel rows of the antenna array, and x represents polarization of the antenna array; and
   wherein:
   the antenna array is a single-polarized antenna array, and x is 1; or
   the antenna array is a dual-polarized antenna array, and x is 2.

2. The method according to claim 1, wherein averaging, based on the first matrix, the channels in the different rows of the antenna array to obtain the second matrix comprises:
   obtaining, along a main diagonal of the first matrix, $x \times R$ matrices whose dimensions are $N/(x \times R)$ rows and $N/(x \times R)$ columns, and averaging the $x \times R$ matrices whose dimensions are $N/(x \times R)$ rows and $N/(x \times R)$ columns, to obtain the second matrix.

3. The method according to claim 1, further comprising:
   obtaining a third matrix based on the second matrix and a transformation matrix, wherein the transformation matrix is related to an uplink frequency and a downlink frequency, and the third matrix is a product of the transformation matrix and the second matrix; and obtaining a weight value based on the third matrix, and weighting data based on the weight value.

4. The method according to claim 3, wherein the transformation matrix is obtained based on a pattern of the channels of the antenna array.

5. The method according to claim 1, further comprising:
before averaging, based on the first matrix, the channels in the different rows of the antenna array to obtain the second matrix, performing singular value decomposition (SVD) on the first matrix, and setting an eigenvalue that is less than a first preset threshold to be zero, to obtain a corrected first matrix.

6. The method according to claim 3, further comprising:
before obtaining the third matrix based on the second matrix and the transformation matrix, performing singular value decomposition (SVD) based on the transformation matrix, and setting an eigenvalue that is less than a second preset threshold to be zero, to obtain a corrected transformation matrix.

7. The method according to claim 3, wherein obtaining the third matrix based on the second matrix and the transformation matrix comprises:
when a sub-path power comprised in the second matrix is a negative number, setting the sub-path power to zero.

8. An apparatus, comprising:
at least one processor; and
a memory storing instructions for execution by the at least one processor, wherein, when executed, the instructions cause the apparatus to perform operations comprising:
obtaining a reference signal fed back by the apparatus;
obtaining a first matrix based on the reference signal, wherein the first matrix is an autocorrelation matrix whose dimension is N rows and N columns, and N indicates a quantity of channels of an antenna array; and
averaging, based on the first matrix, channels in different rows of the antenna array to obtain a second matrix, wherein a dimension of the second matrix is $N/(x \times R)$ rows and $N/(x \times R)$ columns, N, R, and x are all positive integers, R represents a quantity of channel rows of the antenna array, and x represents polarization of the antenna array; and
wherein:
the antenna array is a single-polarized antenna array, and x is 1; or
the antenna array is a dual-polarized antenna array, and x is 2.

9. The apparatus according to claim 8, wherein averaging, based on the first matrix, the channels in the different rows of the antenna array to obtain the second matrix comprises:
obtaining, along a main diagonal of the first matrix, $x \times R$ matrices whose dimensions are $N/(x \times R)$ rows and $N/(x \times R)$ columns, and averaging the $x \times R$ matrices whose dimensions are $N/(x \times R)$ rows and $N/(x \times R)$ columns, to obtain the second matrix.

10. The apparatus according to claim 8, wherein, when executed, the instructions cause the apparatus to perform operations comprising:
obtaining a third matrix based on the second matrix and a transformation matrix, wherein the transformation matrix is related to an uplink frequency and a downlink frequency, and the third matrix is a product of the transformation matrix and the second matrix; and
obtaining a weight value based on the third matrix, and weighting data based on the weight value.

11. The apparatus according to claim 10, wherein the transformation matrix is obtained based on a pattern of the channels of the antenna array.

12. The apparatus according to claim 8, wherein, when executed, the instructions cause the apparatus to perform operations comprising:
before averaging, based on the first matrix, the channels in different rows of the antenna array to obtain the second matrix, performing singular value decomposition (SVD) on the first matrix, and setting an eigenvalue less than a first preset threshold to zero, to obtain a corrected first matrix.

13. The apparatus according to claim 10, wherein, when executed, the instructions cause the apparatus to perform operations comprising:
before obtaining the third matrix based on the second matrix and the transformation matrix, performing singular value decomposition (SVD) based on the transformation matrix, and setting an eigenvalue that is less than a second preset threshold to be zero, to obtain a corrected transformation matrix.

14. The apparatus according to claim 10, wherein obtaining the third matrix based on the second matrix and the transformation matrix comprises:
when a sub-path power comprised in the second matrix is a negative number, setting the sub-path power to zero.

15. A non-transitory memory storage medium comprising computer-executable instructions that, when executed, enable a terminal device to carry out operations comprising:
obtaining a reference signal that is fed back;
obtaining a first matrix based on the reference signal, wherein the first matrix is an autocorrelation matrix whose dimension is N rows and N columns, and N indicates a quantity of channels of an antenna array; and
averaging, based on the first matrix, channels in different rows of the antenna array to obtain a second matrix, wherein a dimension of the second matrix is $N/(x \times R)$ rows and $N/(x \times R)$ columns, N, R, and x are all positive integers, R represents a quantity of channel rows of the antenna array, and x represents polarization of the antenna array; and
wherein:
the antenna array is a single-polarized antenna array, and x is 1; or
the antenna array is a dual-polarized antenna array, and x is 2.

16. The non-transitory memory storage medium according to claim 15, wherein averaging, based on the first matrix, the channels in different rows of the antenna array to obtain the second matrix comprises:
obtaining, along a main diagonal of the first matrix, $x \times R$ matrices whose dimensions are $N/(x \times R)$ rows and $N/(x \times R)$ columns, and averaging the $x \times R$ matrices whose dimensions are $N/(x \times R)$ rows and $N/(x \times R)$ columns, to obtain the second matrix.

17. The non-transitory memory storage medium according to claim 15, wherein the computer-executable instructions, when executed, enable the terminal device to carry out operations comprising:
obtaining a third matrix based on the second matrix and a transformation matrix, wherein the transformation matrix is related to an uplink frequency and a downlink frequency, and the third matrix is a product of the transformation matrix and the second matrix; and
obtaining a weight value based on the third matrix, and weighting data based on the weight value.

18. The non-transitory memory storage medium according to claim 17, wherein the transformation matrix is obtained based on a pattern of the channels of the antenna array.

19. The non-transitory memory storage medium according to claim 15, wherein the computer-executable instructions, when executed, enable the terminal device to carry out operations comprising:
- before averaging, based on the first matrix, the channels in different rows of the antenna array to obtain the second matrix, performing singular value decomposition (SVD) on the first matrix, and setting an eigenvalue that is less than a first preset threshold to be zero, to obtain a corrected first matrix.

20. The non-transitory memory storage medium according to claim 17, wherein the computer-executable instructions, when executed, enable the terminal device to carry out operations comprising:
- before obtaining the third matrix based on the second matrix and the transformation matrix, performing singular value decomposition (SVD) based on the transformation matrix, and setting an eigenvalue that is less than a second preset threshold to be zero, to obtain a corrected transformation matrix.

* * * * *